US012148975B2

(12) United States Patent
Tokuda et al.

(10) Patent No.: US 12,148,975 B2
(45) Date of Patent: Nov. 19, 2024

(54) COUPLER MODULE

(71) Applicant: Murata Manufacturing Co., Ltd., Kyoto (JP)

(72) Inventors: Daisuke Tokuda, Kyoto (JP); Hiromichi Kitajima, Kyoto (JP); Hisanori Murase, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 734 days.

(21) Appl. No.: 17/227,813

(22) Filed: Apr. 12, 2021

(65) Prior Publication Data

US 2021/0234247 A1 Jul. 29, 2021

Related U.S. Application Data

(63) Continuation of application No. PCT/JP2019/049153, filed on Dec. 16, 2019.

(30) Foreign Application Priority Data

Dec. 18, 2018 (JP) ................................ 2018-236106

(51) Int. Cl.
*H01P 5/18* (2006.01)

(52) U.S. Cl.
CPC ..................................... *H01P 5/18* (2013.01)

(58) Field of Classification Search
CPC ...... H01P 5/18; H01P 5/12; H01P 5/16; H01P 5/183; H01P 5/184; H01P 5/185; H01P 5/186; H01P 5/187
See application file for complete search history.

(56) References Cited

U.S. PATENT DOCUMENTS 5,105,171 A * 4/1992 Wen ........................ H01P 5/186 333/116
9,954,564 B2 4/2018 Little et al.
2004/0113716 A1 6/2004 Hilal et al.
(Continued)

FOREIGN PATENT DOCUMENTS

CN 105471390 A 4/2016
CN 107785641 A 3/2018
(Continued)

OTHER PUBLICATIONS

International Search Report issued in Application No. PCT/JP2019/049153, dated Feb. 10, 2020.
(Continued)

*Primary Examiner* — Stephen E. Jones
(74) *Attorney, Agent, or Firm* — Pearne & Gordon LLP

(57) ABSTRACT

A coupler module (1) includes a first component (11) and a second component (21) that are mounted on a substrate. The first component (11) includes a coupler (100) having a main line and an auxiliary line, and the second component (21) includes an external circuit for processing a signal that flows into the main line or the auxiliary line and a plurality of first signal terminals (P5, P6) that are input and output terminals of the external circuit for the signal. The plurality of first signal terminals (P5, P6) are arranged in a first portion (A1) that is one of two portions (A1, A2) obtained by dividing the second component (21) and that is farther from the first component (11).

10 Claims, 9 Drawing Sheets

(56) References Cited

U.S. PATENT DOCUMENTS

| | | | | |
|---|---|---|---|---|
| 2016/0094182 | A1 | 3/2016 | Kobayashi et al. | |
| 2017/0250666 | A1* | 8/2017 | Whitefield | H03H 7/1766 |
| 2018/0062672 | A1 | 3/2018 | Kim | |
| 2019/0260128 | A1 | 8/2019 | Sugaya | |

FOREIGN PATENT DOCUMENTS

| | | | |
|---|---|---|---|
| JP | 2003163505 | A | 6/2003 |
| JP | 2004289797 | A | 10/2004 |
| JP | 2007081502 | A | 3/2007 |
| JP | 2010178014 | A | 8/2010 |
| WO | 2018/101112 | A1 | 6/2018 |

OTHER PUBLICATIONS

Written Opinion issued in Application No. PCT/JP2019/049153, dated Feb. 10, 2020.

You, "Implementation of Low-Cost UHF RFID Reader Front-Ends with Carrier Leakage Suppression Circuit", International Journal of Antennas and Propagation, vol. 2013, p. 1-8.

* cited by examiner

COUPLER MODULE

CROSS REFERENCE TO RELATED APPLICATION

This is a continuation of International Application No. PCT/JP2019/049153 filed on Dec. 16, 2019, which claims priority from Japanese Patent Application No. 2018-236106 filed on Dec. 18, 2018. The contents of these applications are incorporated herein by reference in their entireties.

BACKGROUND OF THE DISCLOSURE

Field of the Disclosure

The present disclosure relates to a coupler module equipped with an external circuit.

Description of the Related Art

In the related art, there is a coupler that is equipped with an external circuit and in which the external circuit is connected to a main line or an auxiliary line of a directional coupler (also simply referred to as a coupler in the present specification) so as to process a signal that flows into the main line or the auxiliary line (see, for example, Patent Document 1 and Patent Document 2).

Patent Document 1 discloses a filter-equipped coupler in which a filter is connected to a coupling port of an auxiliary line. According to the coupler disclosed in Patent Document 1, an unnecessary signal included in a detection signal is eliminated by using the filter (or only a desired signal is allowed to pass the filter), so that a detection signal with less noise is obtained.

Patent Document 2 discloses a coupler that is equipped with an amplifier having an output end connected to an input port of a main line. According to the coupler disclosed in Patent Document 2, the gain of the amplifier is modified by using a detection signal that is retrieved from an auxiliary line of the coupler, so that the power of a main signal outputted by the amplifier can be controlled.

Patent Document 1: U.S. Pat. No. 9,954,564

Patent Document 2: Japanese Unexamined Patent Application Publication No. 2004-289797

BRIEF SUMMARY OF THE DISCLOSURE

A coupler equipped with an external circuit may sometimes be realized as a coupler module in which a coupler and an external circuit (e.g., a filter or an amplifier circuit) that are formed of different components due to differences in their manufacturing processes or the like are mounted on a single module substrate.

In such a coupler module, if there is an unnecessary coupling between a coupler and an external circuit, there is a possibility that a signal will deviate from its original path and that the signal leakage will occur between the coupler and the external circuit, which in turn results in the deterioration of the directionality of the coupler. Although the occurrence of an unnecessary coupling can be suppressed by keeping a sufficient distance between the coupler and the external circuit, in this case, a problem occurs in that the size of the coupler module increases.

Accordingly, it is an object of the present disclosure to provide a coupler module that is equipped with an external circuit and that is capable of easily suppressing the occurrence of an unnecessary coupling between a coupler and the external circuit without increasing the size of the coupler module.

To achieve the above-mentioned object, a coupler module according to an aspect of the present disclosure is a coupler module in which a first component and a second component are mounted on a substrate, and in the coupler module, the first component includes a directional coupler having a main line and an auxiliary line. The second component includes an external circuit for processing a signal that flows into the main line or the auxiliary line and a plurality of first signal terminals that are input and output terminals of the external circuit for the signal. When viewed in plan view, the plurality of first signal terminals are arranged in a first portion that is one of two portions obtained by dividing the second component and that is farther from the first component.

The signal input and output terminals of the external circuit are arranged in the first portion that is one of the two portions obtained by dividing the second component and that is farther from the coupler, so that these terminals may easily be spaced apart from the coupler. This makes it easier to suppress the occurrence of an unnecessary coupling between the coupler and the external circuit without increasing the size of the coupler module, and the directionality of the coupler can be improved.

Figure 2A:
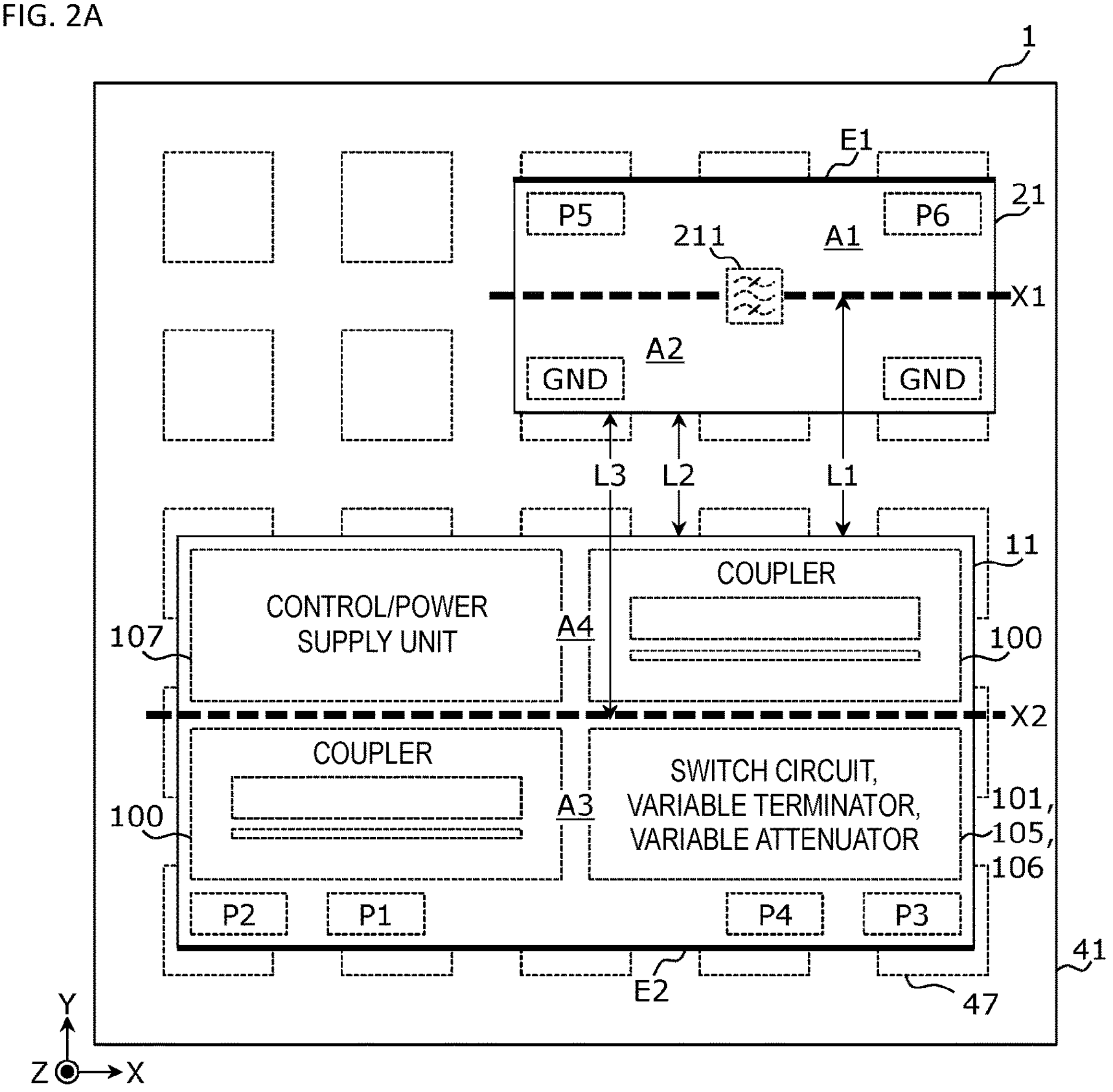
Figure 2B:
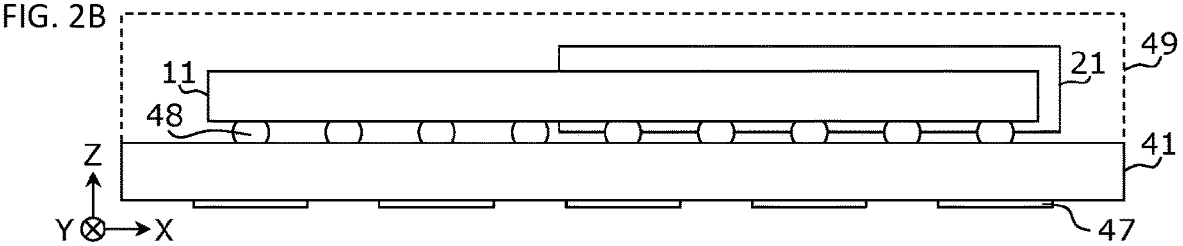
Figure 2C:
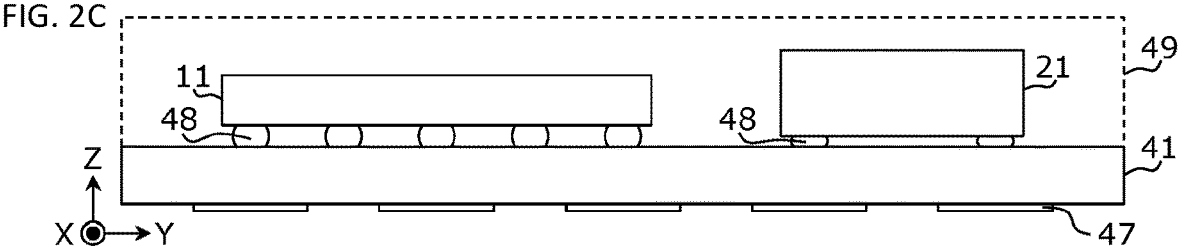

Each of FIGS. 2A, 2B and 2C is a diagram illustrating an example of a structure of the coupler module according to the first embodiment.

Figure 3:
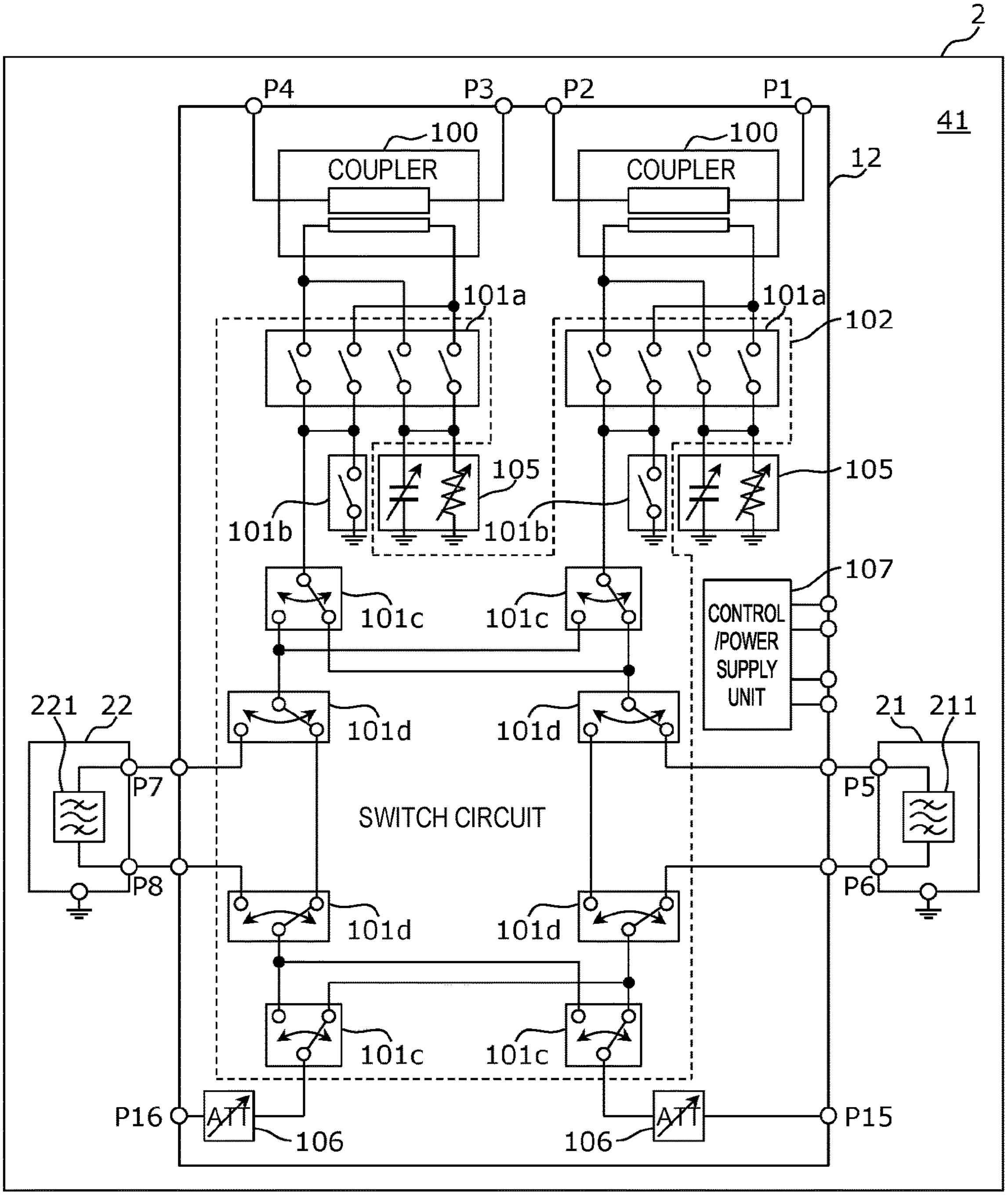

FIG. 3 is a block diagram illustrating an example of a functional configuration of a coupler module according to a second embodiment.

Figure 4A:
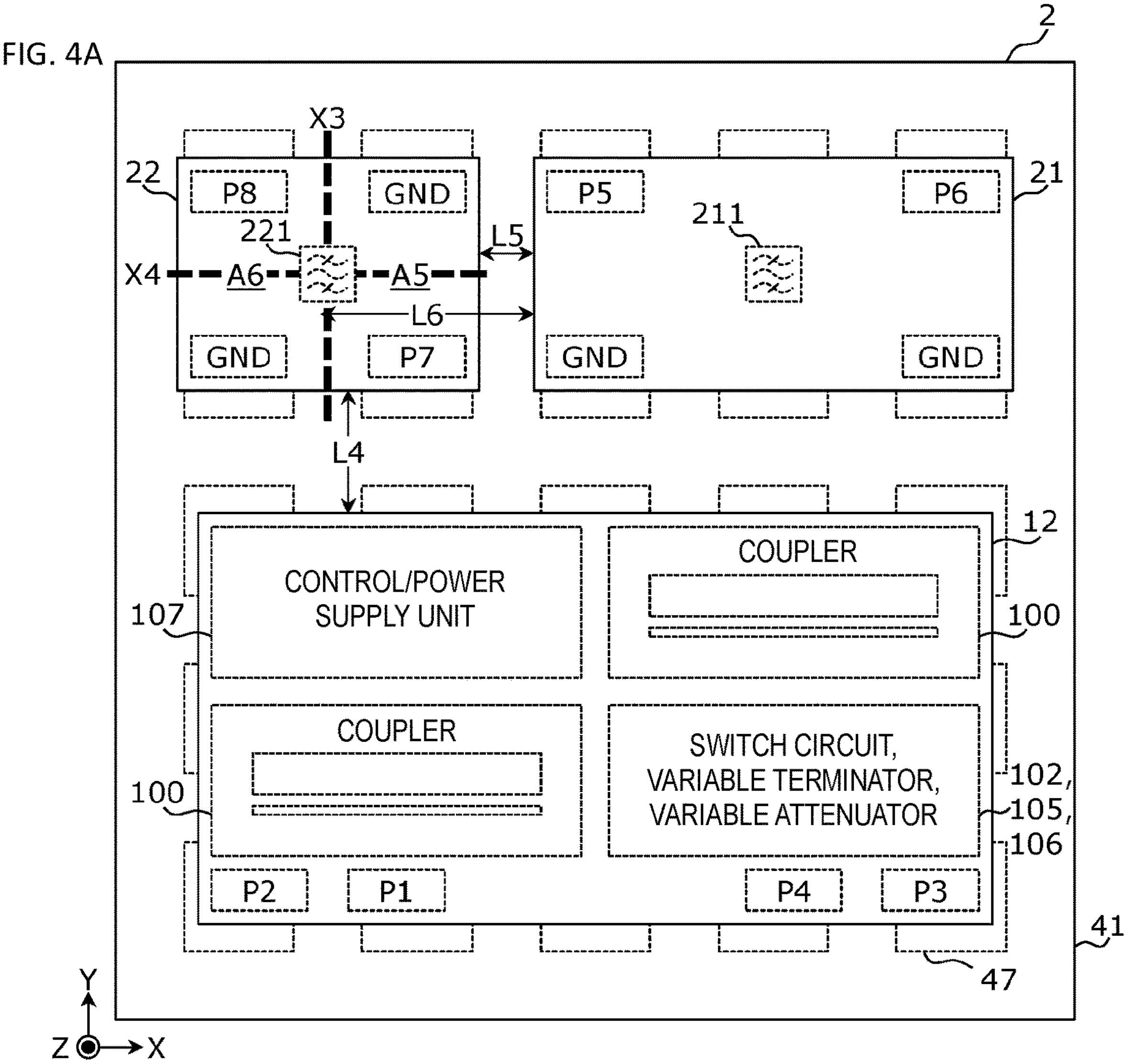
Figure 4B:
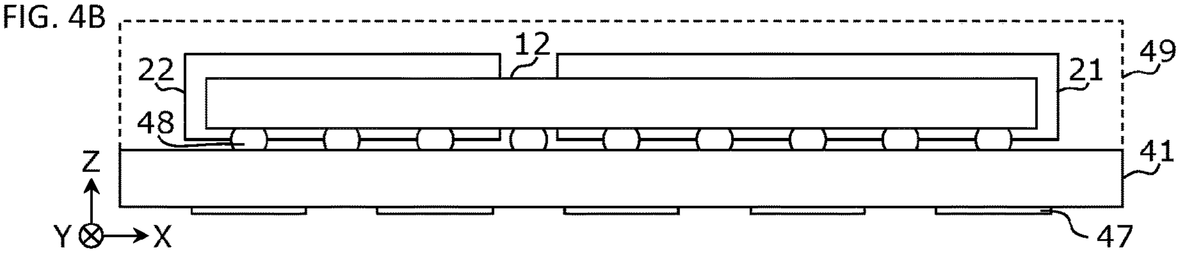
Figure 4C:
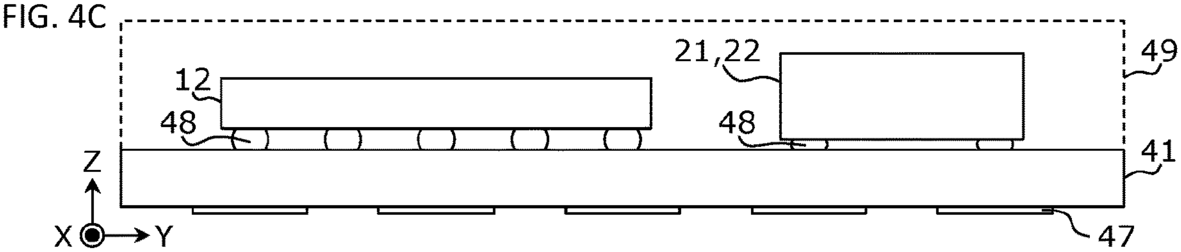

Each of FIGS. 4A, 4B and 4C is a diagram illustrating an example of a structure of the coupler module according to the second embodiment.

Figure 5:
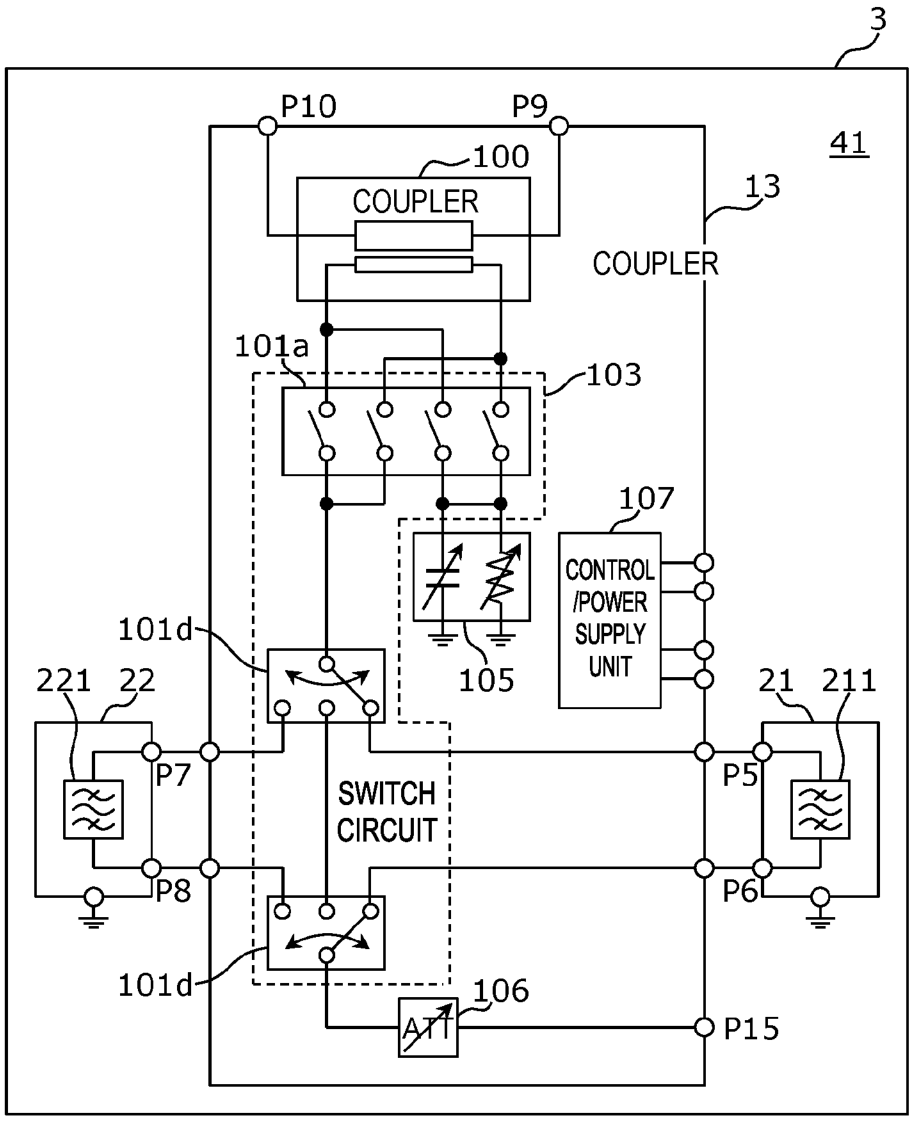

FIG. 5 is a block diagram illustrating an example of a functional configuration of a coupler module according to a modification of the second embodiment.

Figure 6A:
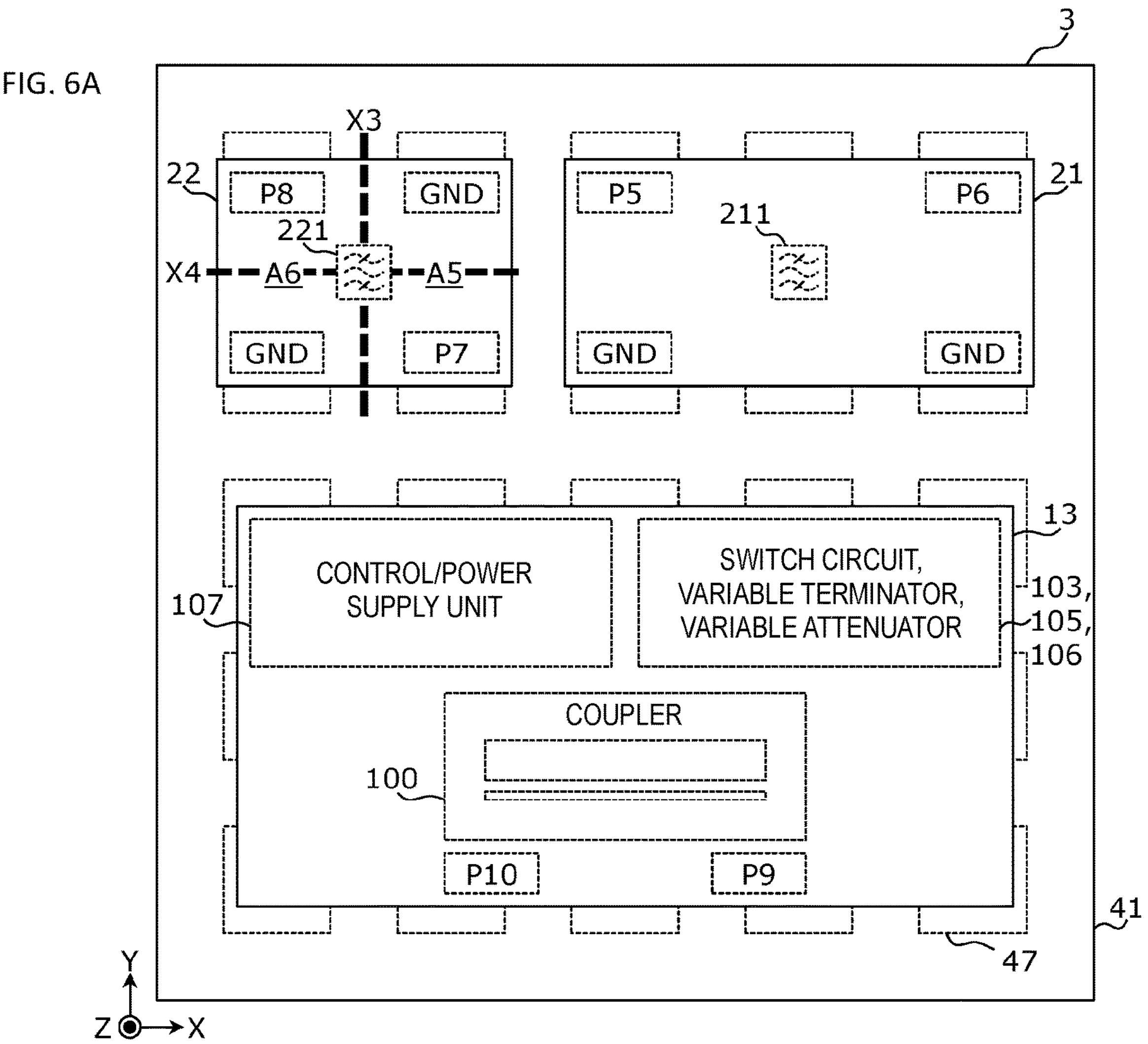
Figure 6B:
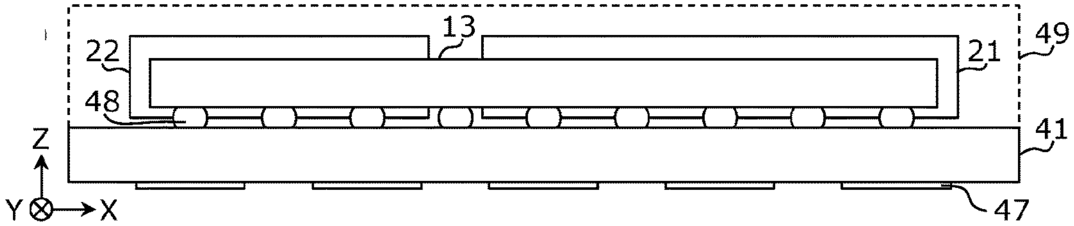
Figure 6C:
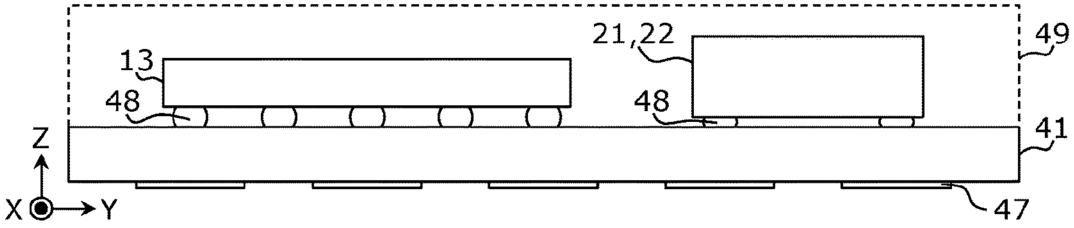

Each of FIGS. 6A, 6B and 6C is a diagram illustrating an example of a structure of the coupler module according to the modification of the second embodiment.

Figure 7:
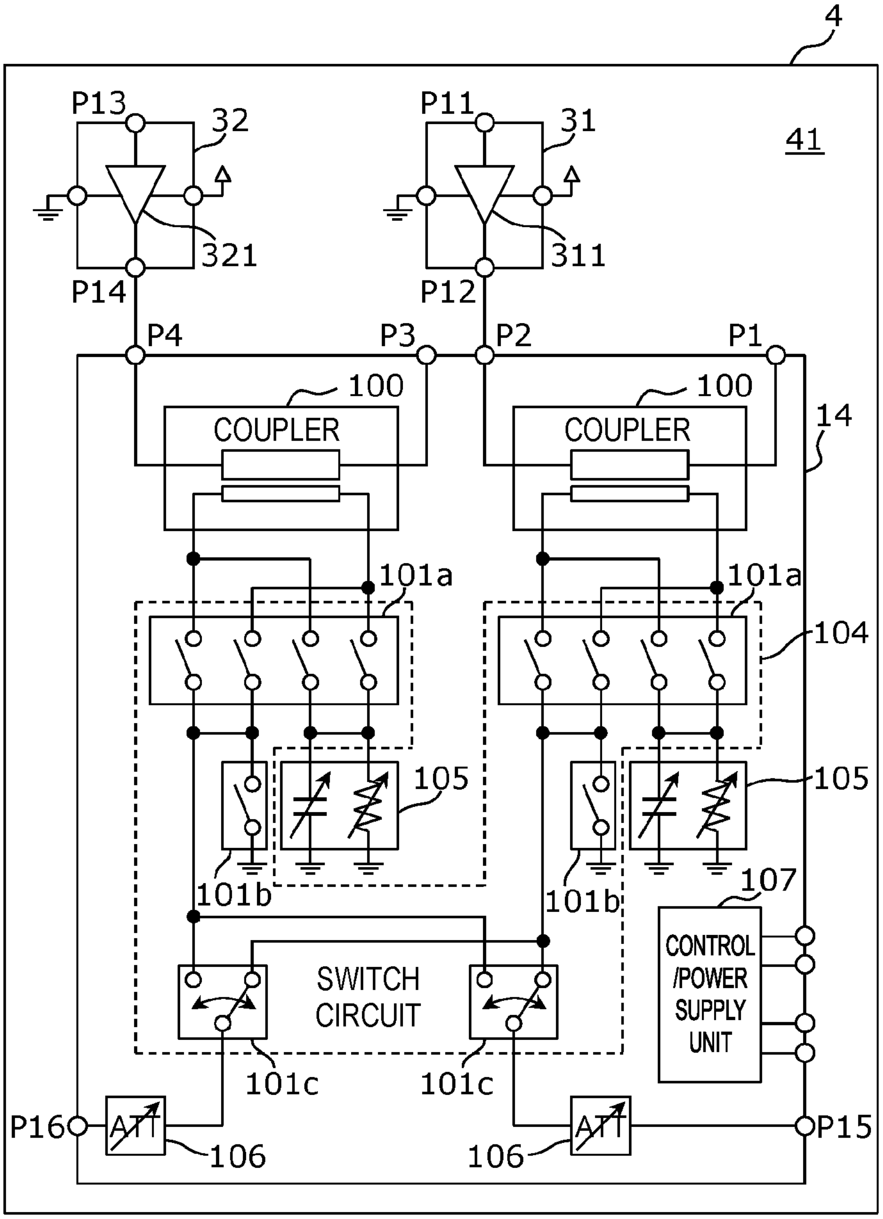

FIG. 7 is a block diagram illustrating an example of a functional configuration of a coupler module according to a third embodiment.

Figure 8A:
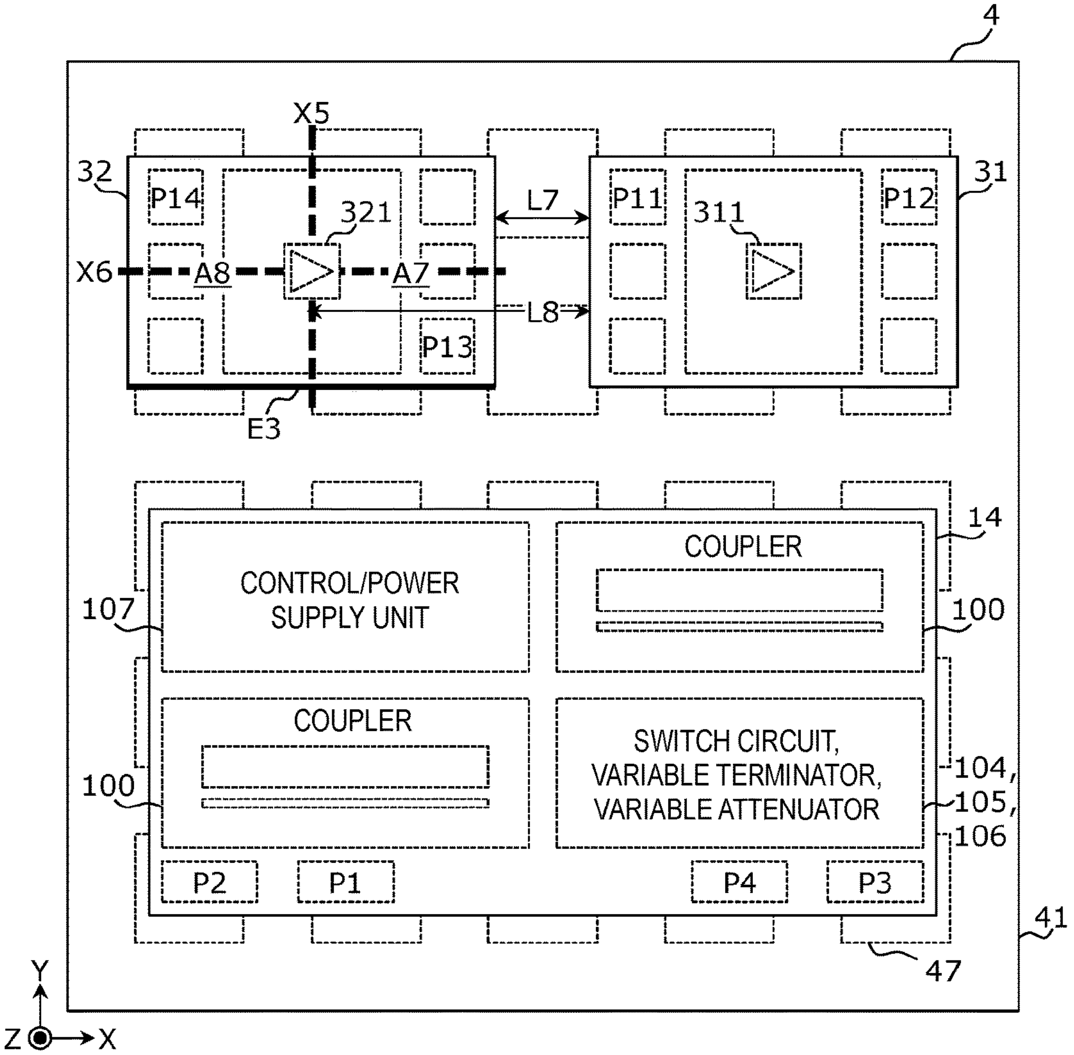
Figure 8B:
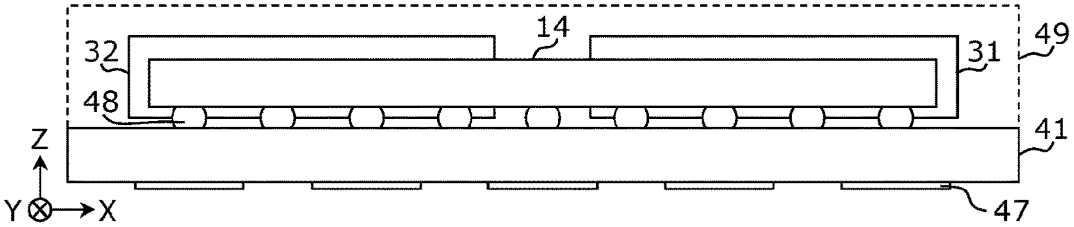
Figure 8C:
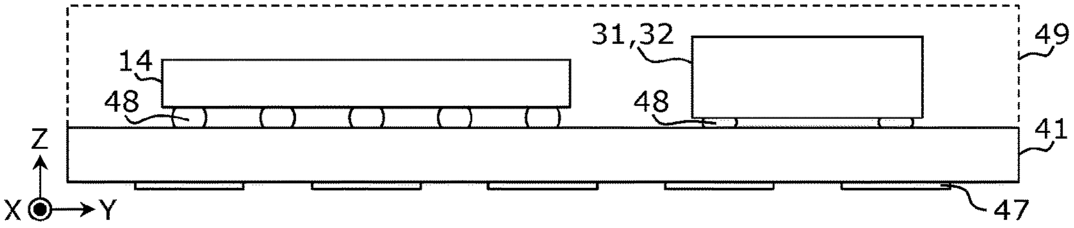

Each of FIGS. 8A, 8B and 8C is a diagram illustrating an example of a structure of the coupler module according to the third embodiment.

Figure 9:
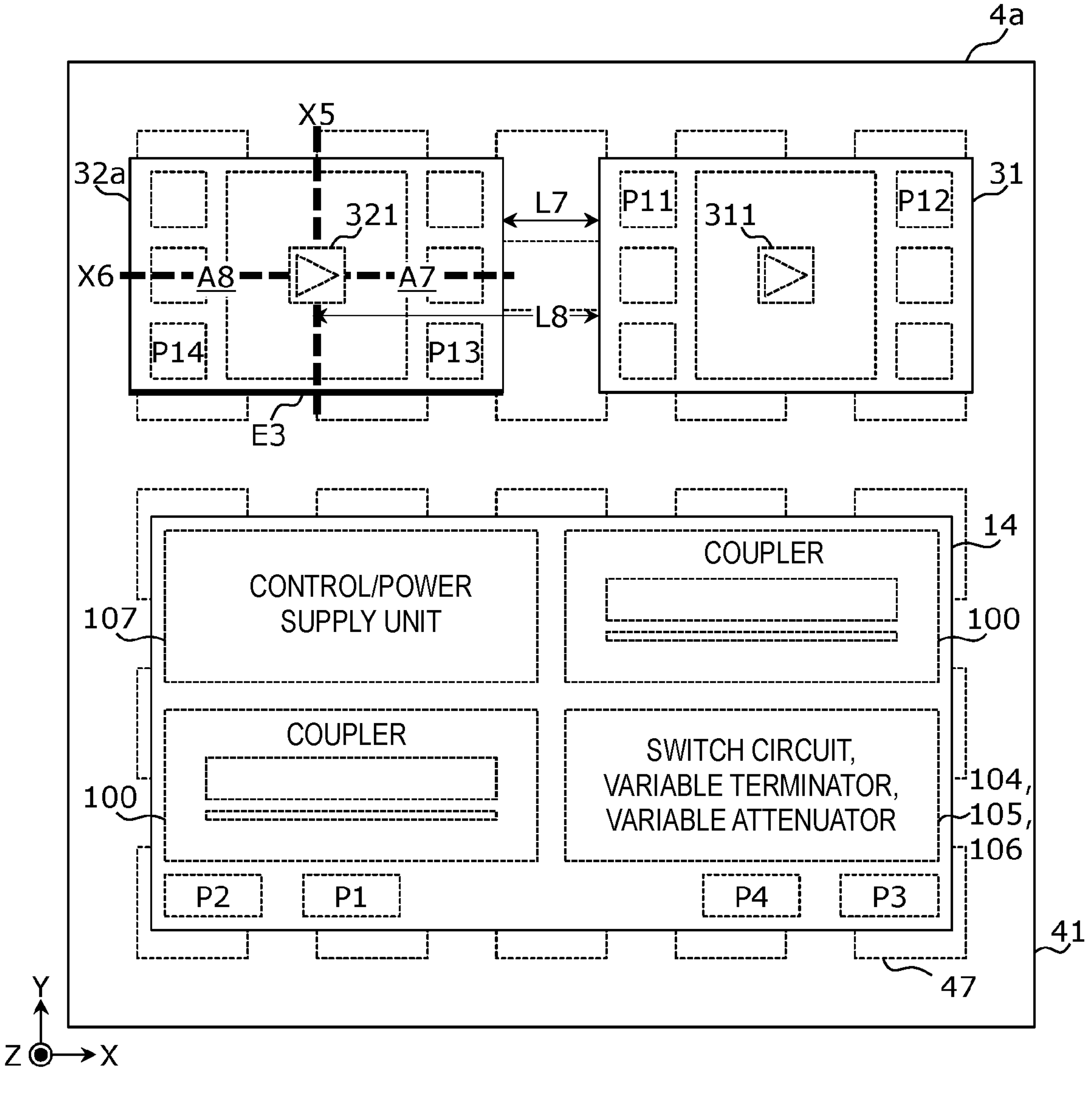

FIG. 9 is a diagram illustrating another example of the structure of the coupler module according to the third embodiment.

DETAILED DESCRIPTION OF THE DISCLOSURE

Embodiments of the present disclosure will be described in detail below with reference to the drawings. Note that the embodiments, which will be described below, are comprehensive or specific examples. Numerical values, shapes, materials, components, arrangement positions and connection configurations of the components, and so forth that are described in the following embodiments are examples and are not intended to limit the scope of the present disclosure.

First Embodiment

A filter-equipped coupler in which a single coupler component and a single filter component are mounted on a single module substrate will be described as an example of a coupler module according to the first embodiment. Note that a "coupler module" will hereinafter sometimes be referred to as a "module".

Figure 1:
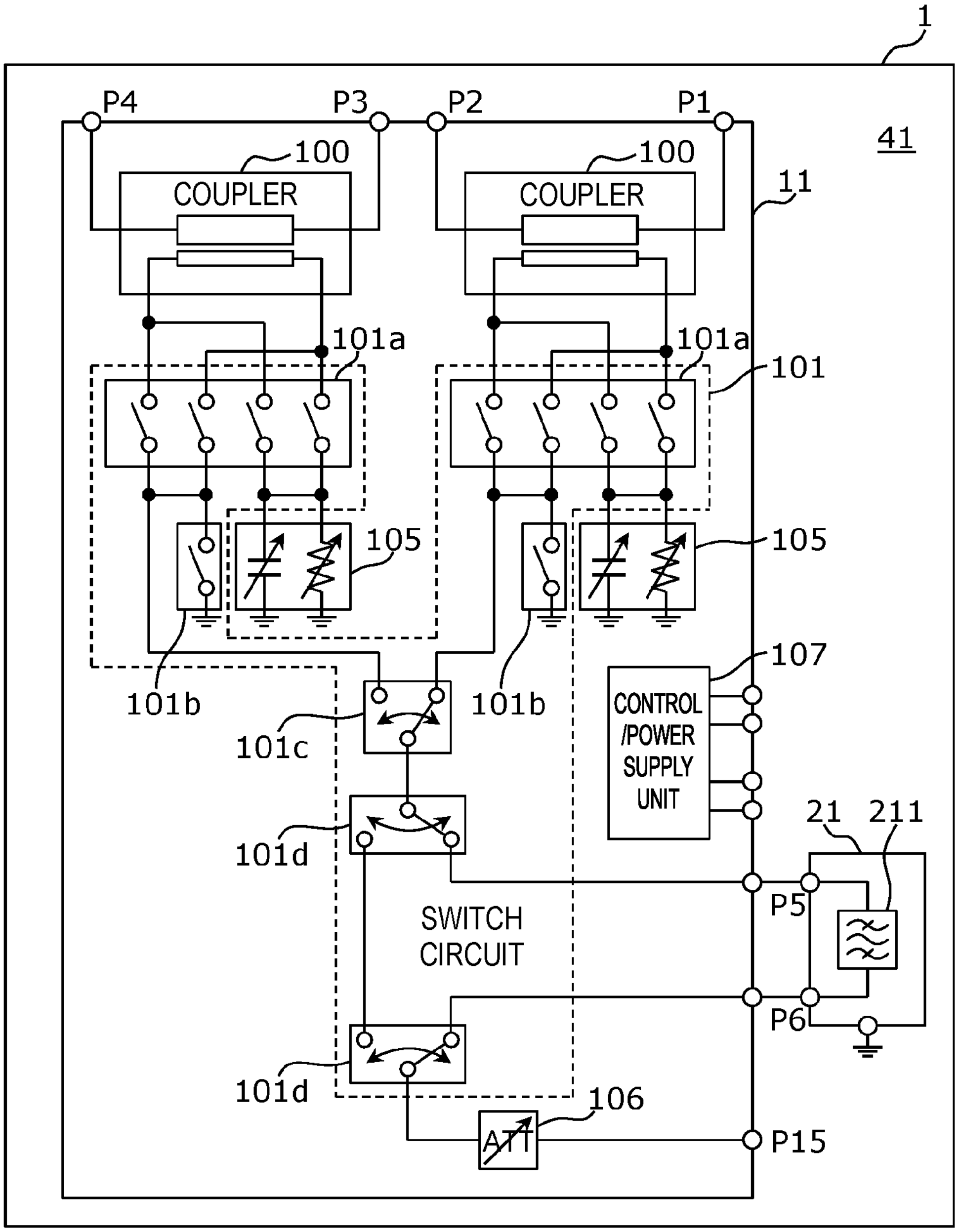
FIG. 1 is a block diagram illustrating an example of a functional configuration of a coupler module according to a first embodiment.

FIG. 1 is a block diagram illustrating an example of a functional configuration of the coupler module according to the first embodiment. As illustrated in FIG. 1, a module 1 equipped with an external circuit includes a first component 11 that is a coupler component and a second component 21 that is a filter component. The first component 11 and the second component 21 are mounted on a module substrate 41.

The first component 11 includes two couplers 100, a switch circuit 101, two variable terminators 105, a variable attenuator 106, and a control/power supply unit 107. In each of the couplers 100 illustrated in FIG. 1, a main line and an auxiliary line are schematically represented by a relatively wide rectangle and a relatively narrow rectangle, respectively.

Each of the couplers 100 outputs, from a first end of the auxiliary line, a detection signal that corresponds to the direction and the power of a main signal supplied to the main line.

The switch circuit 101 forms a signal path for detection signals that connects the first or second end of the auxiliary line of one of the two couplers 100 and a detection-signal output terminal P15 of the coupler 100 to each other. The switch circuit 101 includes a plurality of switches 101*a* to 101*d*.

The switches 101*a* are coupling-direction selector switches each of which connects the first and second ends of the auxiliary line of one of the couplers 100 to the detection-signal output terminal P15 or a corresponding one of the variable terminators 105. The connection destinations of the first and second ends of the auxiliary line of each of the couplers 100 are switched by using the switches 101*a*, so that a detection signal corresponding to a main signal that flows through the main line of the coupler 100 in a forward direction from an input terminal to an output terminal or a detection signal corresponding to a main signal that flows through the main line of the coupler 100 in a reverse direction from the output terminal to the input terminal is selectively outputted.

The switches 101*b* is a short-circuit switch that causes a short-circuit in one of the two couplers 100 that is not used, and the switch 101*c* is a switch that connects one of the two couplers 100 that is used to the detection-signal output terminal P15.

The switches 101*d* are switches for connecting or disconnecting a filter circuit 211, which will be described later, to or from the signal path for detection signals.

Each of the variable terminators 105 is connected to one of the two ends of the auxiliary line of the corresponding coupler 100, the one end being opposite to the end of the auxiliary line at which a detection signal is retrieved, via the corresponding switch 101*a* and adjusts the directionality of the coupler 100.

The variable attenuator 106 is connected to the signal path for detection signals via the switches 101*a* to 101*d* and adjusts the gain (the degree of coupling) of each of the couplers 100.

The control/power supply unit 107 performs driving and adjustment of the switch circuit 101, the variable terminators 105, and the variable attenuator 106. The control/power supply unit 107 may perform the driving and the adjustment on the basis of communication with the external circuit and may include a memory for storing the contents of control (not illustrated).

The second component 21 includes the filter circuit 211.

The filter circuit 211 is a band-pass filter having a pass band corresponding to the frequency band of detection signals. The filter circuit 211 is connected to the switch circuit 101 by a wiring line of the module substrate 41. The switches 101*d* of the switch circuit 101 incorporates the filter circuit 211 into the signal path for detection signals or causes the filter circuit 211 to bypass the signal path for detection signals.

The first component 11 may be, for example, an integrated circuit chip in which a circuit is formed on a silicon substrate through a semiconductor process. The first component 11 includes a plurality of connection terminals including signal terminals P1 to P4 that are connected to the main lines of the couplers 100.

The second component 21 may be, for example, an LC resonance filter that includes a capacitor and an inductor formed on a multilayer ceramic substrate or may be a filter using an acoustic wave resonator or a dielectric resonator. The second component 21 includes a plurality of connection terminals including signal terminals P5 and P6 that are signal input and output terminals of the filter circuit 211.

The module substrate 41 may be, for example, a printed wiring board made of a resin material. The first component 11 and the second component 21 are connected to each other by a wiring line formed on the module substrate 41.

The module 1 allows a detection signal that corresponds to the signal supplied to the main line of one of the couplers 100 to pass the filter circuit 211 or outputs the detection signal such that the detection signal bypasses the filter circuit 211 depending on the connection state of the switch circuit 101.

In this case, if there is an unnecessary coupling between the coupler 100 and the filter circuit 211, there is a possibility that a signal will deviate from its original path and that the signal leakage will occur between the coupler 100 and the filter circuit 211, which in turn results in the deterioration of the directionality of the coupler 100. Although an unnecessary coupling can be suppressed by keeping a sufficient distance between the first component 11 and the second component 21, in this case, a problem occurs in that the size of the module 1 increases.

Accordingly, we propose a structure that facilitates the suppression of an unnecessary coupling between the couplers 100 and the filter circuit 211 without increasing the size of the module 1.

Each of FIGS. 2A, 2B and 2C is a diagram illustrating an example of a structure of the coupler module 1. FIG. 2A is a plan view, FIG. 2B is a front view, and FIG. 2C is a side view.

As illustrated in FIGS. 2A, 2B and 2C, the connection terminals (the signal terminals P1 to P6 and ground terminals GND) of the first and second components 11 and 21 are connected to the top surface of the module substrate 41 with a conductive bonding material 48 such as solder. Here, the signal terminals P5 and P6 of the second component 21 are each an example of a first signal terminal, and the signal terminals P1 to P4 of the first component 11 are each an example of a second signal terminal.

Mounting terminals (land electrodes) 47 for connecting the module 1 to a device such as a communication device that uses the module 1 are formed on the bottom surface of the module substrate 41. The first component 11 and the second component 21 are fixed in place by a thermosetting sealing resin 49 such as an epoxy resin. Note that, in order to simplify FIG. 2A, the sealing resin 49 is not illustrated in FIG. 2A.

According to the arrangements of the components and the connecting electrodes illustrated in FIGS. 2A, 2B and 2C, the following advantageous effects can be obtained.

The second component 21 is divided into two portions A1 and A2 by an axis X1, and when viewed in plan view, the signal terminals P5 and P6 (the first signal terminals) of the second component 21 are arranged in the first portion A1 that is farther from the first component 11.

Note that, in the present specification, the wording "is farther from/closer to" refers to "the shortest distance from a subject to a target object is longer/is shorter". In the case illustrated in FIGS. 2A, 2B and 2C, the shortest distance from the portion A1 to the first component 11 and the shortest distance from the portion A2 to the first component 11 are the shortest distance L1 and the shortest distance L2, respectively, and the shortest distance L1 is longer than the shortest distance L2. Thus, in the second component 21, the portion A1 is farther from the first component 11 than the portion A2 is.

As a result, even in the case where the first component 11 and the second component 21 are closely arranged so as to be spaced apart from each other by a minimum separation distance that is necessary to mount these components, the signal terminals P5 and P6 may easily be spaced apart from the couplers 100 included in the first component 11. This makes it easier to suppress the occurrence of an unnecessary coupling between the couplers 100 and the filter circuit 211 without increasing the size of the module 1.

More specifically, the main lines of the couplers 100 and the signal terminals P1 to P4 can each be prevented from being directly connected to the signal terminal P5 of the filter circuit 211 without passing through the auxiliary lines of the couplers 100. As a result, the directionality of each of the couplers 100 can be improved.

In addition, the main lines of the couplers 100 and the signal terminals P1 to P4 can each be prevented from being directly connected to the signal terminal P6 of the filter circuit 211 without passing through the auxiliary lines of the couplers 100. As a result, the directionality of each of the couplers 100 can be improved, and at the same time, a signal outside the pass band of the filter circuit 211 can be prevented from being unnecessarily outputted to the signal terminal P6.

The signal terminals P5 and P6 are arranged along a side E1 of the first portion A1 of the second component 21. More specifically, the signal terminals P5 and P6 are arranged at positions that are closer to the side E1 than the axis X1, the side E1 being farthest from the first component 11 among all the sides of the first portion A1.

As a result, the signal terminals P5 and P6 can be separated from the couplers 100 included in the first component 11 with higher certainty, and the occurrence of an unnecessary coupling can be more effectively suppressed.

When viewed in plan view, the second component 21 has a rectangular shape having a long side that corresponds to the side E1 of the portion A1, and the signal terminals P5 and P6 are arranged at the two end portions of the side E1. Note that, in the present specification, the term "rectangular shape" includes not only a quadrilateral shape whose four angles are all right angles, but also a quadrilateral shape having at least one chamfered angle so as to form a curved surface.

As a result, the isolation between the signal terminals P5 and P6 can be improved.

One of the ground terminals GND is disposed between the signal terminal P5 and the first component 11, and the other ground terminal GND is disposed between the signal terminal P6 and the first component 11.

Consequently, the coupling between the signal terminals P5 and P6 and the couplers 100 can be suppressed by using the ground terminals GND.

The first component 11 is divided into two portions A3 and A4 by an axis X2, and when viewed in plan view, the signal terminals P1 to P4 (the second signal terminals) of the first component 11 are arranged in the second portion A3 that is farther from the second component 21.

In the case illustrated in FIGS. 2A, 2B and 2C, the shortest distance from the portion A3 to the second component 21 and the shortest distance from the portion A4 to the second component 21 are the shortest distance L3 and the shortest distance L2, respectively, and the shortest distance L3 is longer than the shortest distance L2. Thus, in the first component 11, the portion A3 is farther from the second component 21 than the portion A4 is.

As a result, even in the case where the first component 11 and the second component 21 are closely arranged so as to be spaced apart from each other by a minimum separation distance that is necessary to mount these components, the signal terminals P1 to P4 may easily be spaced apart from the filter circuit 211 included in the second component 21. This makes it easier to suppress the occurrence of an unnecessary coupling between the couplers 100 and the filter circuit 211 without increasing the size of the module 1, and the directionality of each of the couplers 100 can be improved.

The signal terminals P1 to P4 are arranged along a side E2 of the second portion A3 of the first component 11. More specifically, the signal terminals P1 to P4 are arranged at positions that are closer to the side E2 than the axis X2, the side E2 being farthest from the second component 21 among all the sides of the second portion A3.

As a result, the signal terminals P1 to P4 can be separated from the filter circuit 211 included in the second component 21 with higher certainty, and the occurrence of an unnecessary coupling can be more effectively suppressed.

Note that, in the case illustrated in FIGS. 2A, 2B and 2C, although all the signal terminals P1 to P4 are arranged along the side E2, the present disclosure is not limited to this case. For example, at least half of the signal terminals P1 to P4 may be arranged along the side E2. In this case, the occurrence of an unnecessary coupling can be more effectively suppressed compared with the case where at least half of the signal terminals P1 to P4 are not arranged along the side E2.

Among the signal terminals P1 to P4, the distance between the signal terminals P1 and P2 and the distance between the signal terminals P3 and P4 are each shorter than the distance between the signal terminals P1 and P4. In the case where two or more couplers 100 are included in the first component 11 as described above, if the distance between the signal terminals that are connected to the main lines of different couplers is set to be long (e.g., to be longer than the distance between the signal terminals that are connected to the main line of the same coupler), an unnecessary coupling between the couplers 100 can also be suppressed, and thus, a coupler module having favorable characteristics can be obtained.

Note that, in FIGS. 2A, 2B and 2C, the axis X1, which divides the first component 11 into the two portions when viewed in plan view, and the axis X2, which divides the second component 21 into the two portions when viewed in plan view, are respectively an axis that divides the first component 11 into two portions having the same area when viewed in plan view and an axis that divides the second component 21 into two portions having the same area. However, the way in which the axes X1 and X2 divide the first and second components 11 and 21 is not limited to this. For example, the first component 11 may be divided into two portions having different areas by the axis X1, and the second component 21 may be divided into two portions having different areas by the axis X2. Even in the case where each of the first and second components 11 and 21 is unevenly divided as mentioned above, if the signal terminals P1 to P4 are located farther from the second component 21, or if the signal terminals P5 and P6 are located farther from the first component 11, an unnecessary coupling between the couplers 100 and the filter circuit 211 can be suppressed.

Second Embodiment

A filter-equipped coupler in which a single coupler component and two filter components are mounted on a single module substrate will be described as an example of a module according to the second embodiment. In the following description, the components mentioned in the first embodiment are denoted by the same reference signs so as to omit the descriptions thereof, and the matters different from those in the first embodiment will be mainly described.

FIG. 3 is a block diagram illustrating an example of a functional configuration of a coupler module according to the second embodiment. As illustrated in FIG. 3, a module 2 that is equipped with an external circuit is different from the module 1 illustrated in FIG. 1 in that the module 2 includes a first component 12 that is a coupler component and further includes a third component 22 that is a filter component.

In the first component 12, the switch circuit 101 of the first component 11 is changed to a switch circuit 102, and the first component 12 further includes another variable attenuator 106.

The switch circuit 102 forms two signal paths for detection signals in parallel, and each of these signal paths connects the first or second end of the auxiliary line of one of the two couplers 100 and one of the two detection-signal output terminals P15 and P16 to each other. The switch circuit 102 includes the plurality of switches 101*a* to 101*d*. Each of these switches plays the same role as the switch that is indicated by the same reference sign and that is included in the switch circuit 101 illustrated in FIG. 1.

The third component 22 includes a filter circuit 221.

The filter circuit 221 is a low-pass filter having a pass band corresponding to the frequency band of detection signals. The filter circuit 221 is connected to the switch circuit 102 by a wiring line of the module substrate 41. The switch circuit 102 incorporates each of the filter circuits 211 and 221 into one of the two signal paths for detection signals or causes each of the filter circuits 211 and 221 to bypass one of the two signal paths for detection signals.

The first component 12 may be, for example, an integrated circuit chip in which a circuit is formed on a silicon substrate through a semiconductor process. The first component 12 includes a plurality of connection terminals including the signal terminals P1 to P4 connected to the main lines of the couplers 100.

The third component 22 may be, for example, an LC resonance filter that includes a capacitor and an inductor formed on a multilayer ceramic substrate or may be a filter using an acoustic wave resonator or a dielectric resonator. The third component 22 includes a plurality of connection terminals including signal terminals P7 and P8 that are signal input and output terminals of the filter circuit 221.

Each of FIGS. 4A, 4B and 4C is a diagram illustrating an example of a structure of the coupler module 2. FIG. 4A is a plan view, FIG. 4B is a front view, and FIG. 4C is a side view.

As illustrated in FIGS. 4A, 4B and 4C, the module 2 is different from the module 1 illustrated in FIGS. 2A, 2B and 2C in that the module 2 further includes the third component 22. The second component 21 and the third component 22 are arranged adjacent to each other so as to face the first component 12 when the module substrate 41 is viewed in plan view. Here, the signal terminals P5 and P6 of the second component 21 are each an example of the first signal terminal, the signal terminals P1 to P4 of the first component 12 are each an example of the second signal terminal, and the signal terminals P7 and P8 of the third component 22 are each an example of a third signal terminal.

According to the arrangements of the components and the connecting electrodes illustrated in FIGS. 4A, 4B and 4C, the following advantageous effects can be obtained in addition to the advantageous effects of the module 1 described above.

When viewed in plan view, the third component 22 is divided into two portions A5 and A6 by an axis X3. The third portion A5 is closer to the second component 21, and the fourth portion A6 is farther from the second component 21.

In the case illustrated in FIGS. 4A, 4B and 4C, the shortest distance from the portion A5 to the second component 21 and the shortest distance from the portion A6 to the second component 21 are the shortest distance L5 and the shortest distance L6, respectively, and the shortest distance L6 is longer than the shortest distance L5. Thus, in the third component 22, the portion A6 is farther from the second component 21 than the portion A5 is.

Among the signal terminals P7 and P8 (the third signal terminals) of the third component 22, when viewed in plan view, the signal terminal P7 is disposed in one of two portions obtained by dividing the third portion A5 by an axis X4, the one portion being farther from the signal terminal P5 of the second component 21.

In addition, when viewed in plan view, among the signal terminals P7 and P8 of the third component 22, the signal terminal P8 is disposed in one of two portions obtained by dividing the fourth portion A6 by the axis X4, the one portion being farther from the first component 12.

As a result, even in the case where the second component 21 and the third component 22 are closely arranged so as to be spaced apart from each other by a minimum separation distance that is necessary to mount these components, the signal terminals P7 and P8 may easily be spaced apart from the signal terminal P5, which is one of the signal terminals P5 and P6 of the second component 21 and which is closest to the third component 22. This makes it easier to suppress the occurrence of an unnecessary coupling between the signal terminals P7 and P8 and the signal terminal P5 without increasing the size of the module 2. As a result, the deterioration of the filter characteristics that is caused by the interference between the filter circuits 211 and 221 such as ripple in a pass band and spurious response in a stop band can be minimized.

In addition, the signal terminals P7 and P8 may easily be spaced apart from each other in a diagonal direction of the third component 22, and thus, the isolation between the signal terminals P7 and P8 can be improved.

Furthermore, the signal terminal P8 may easily be spaced apart from the first component 12, and thus, an unnecessary coupling between the signal terminal P8 and the first component 12 can be suppressed.

Note that, according to the structure of the module 2, the signal terminal P7 is likely to be close to the first component 12, and thus, the coupling between the signal terminal P7 and the couplers 100 is likely to occur. Thus, from the standpoint of suppressing the coupling between the signal terminal P7 and the couplers 100, the structure of the module 2 may be employed in the case where the shortest distance L4 between the first component 12 and the third component 22 is relatively long (e.g., longer than the shortest distance L5 between the second component 21 and the third component 22).

In contrast, in the case where the shortest distance L4 between the first component 12 and the third component 22 is relatively short (e.g., shorter than the shortest distance L5 between the second component 21 and the third component 22), the signal terminal P7 may be disposed in one of the portions obtained by dividing the third portion A5 by the axis X4, the one portion being farther from the first component 12.

The structure of the module 2 can also be applied in the case where the coupler component includes a single coupler, and similar advantageous effects can be obtained.

FIG. 5 is a block diagram illustrating an example of a functional configuration of a coupler module according to a modification of the second embodiment. As illustrated in FIG. 5, the difference between a module 3 that is equipped with an external circuit and the module 2 illustrated in FIG. 3 is a first component 13 that is a coupler component.

In the first component 13, the switch circuit 102 of the first component 12 is changed to a switch circuit 103, and unlike the first component 12, the number of couplers 100 and the number of variable attenuators 106 are each reduced to one. The switch circuit 103 includes the plurality of switches 101*a* and 101*d*. Each of these switches plays the same role as the switch that is indicated by the same reference sign and that is included in the switch circuit 101 illustrated in FIG. 1.

Each of FIGS. 6A, 6B and 6C is a diagram illustrating an example of a structure of the coupler module 3. FIG. 6A is a plan view, FIG. 6B is a front view, and FIG. 6C is a side view.

As illustrated in FIGS. 6A, 6B and 6C, the module 3 is different from the module 2 illustrated in FIGS. 4A, 4B and 4C in that the first component 12 is replaced with the first component 13. The first component 13 includes signal terminals P9 and P10 instead of the signal terminals P1 to P4 of the first component 12. Here, the signal terminals P5 and P6 of the second component 21 are each an example of the first signal terminal, the signal terminals P9 and P10 of the first component 12 are each an example of the second signal terminal, and the signal terminals P7 and P8 of the third component 22 are each an example of the third signal terminal.

According to such arrangements of the components and the connecting electrodes in the module 3, advantageous effects similar to the advantageous effects of the module 2 described above can be obtained.

Note that, in FIGS. 4A, 4B and 4C and FIGS. 6A, 6B and 6C, the axes X3 and X4 each of which divides the third component 22 into two portions when viewed in plan view are each an axis that divides the third component 22 into two portions having the same area when viewed in plan view. However, the way in which each of the axes X3 and X4 divides the third component 22 is not limited to this. For example, the third component 22 may be divided into two portions having different areas by each of the axes X3 and X4. Even in the case where the third component 22 is unevenly divided as mentioned above, if the signal terminals P7 and P8 are located at positions such as those mentioned above, the deterioration of the filter characteristics that is caused by the interference between the filter circuits 211 and 221 can be minimized, and the isolation between the signal terminals P7 and P8 can also be improved.

Third Embodiment

An amplifier-equipped coupler module in which a single coupler component and two amplifier components are mounted on a single module substrate will be described as an example of a module according to the third embodiment. In the following description, the components mentioned in the first and second embodiments are denoted by the same reference signs so as to omit the descriptions thereof, and the matters different from those in the first and second embodiments will be mainly described.

FIG. 7 is a block diagram illustrating an example of a functional configuration of a coupler module according to the third embodiment. As illustrated in FIG. 7, the differences between a module 4 that is equipped with an external circuit and the module 2 illustrated in FIG. 3 are a first component 14 that is a coupler component, a second component 31 that is an amplifier component, and a third component 32 that is another amplifier component. The second component 21 and the third component 22, each of which is a filter component, are removed from the module 4.

In the first component 14, the switch circuit 102 of the first component 12 is changed to a switch circuit 104.

The switch circuit 104 forms two signal paths for detection signals in parallel, and each of these signal paths connects the first or second end of the auxiliary line of one of the two couplers 100 and one of the two detection-signal output terminals P15 and P16 to each other. The switch circuit 104 includes the plurality of switches 101*a* to 101*c*. Each of these switches plays the same role as the switch that is indicated by the same reference sign and that is included in the switch circuit 101 illustrated in FIG. 1.

The second component 31 includes an amplifier circuit 311. The amplifier circuit 311 is connected to the main line of one of the couplers 100 by a wiring line of the module substrate 41.

The third component 32 includes an amplifier circuit 321. The amplifier circuit 321 is connected to the main line of the other one of the couplers 100 by a wiring line of the module substrate 41.

The first component 14 may be, for example, an integrated circuit chip in which a circuit is formed on a silicon substrate through a semiconductor process. The first component 14 includes a plurality of connection terminals including the signal terminals P1 to P4 connected to the main lines of the couplers 100.

The second component 31 and the third component 32 may each be, for example, an integrated circuit chip in which a circuit is formed on a silicon substrate through a semiconductor process. The second component 31 includes a plurality of connection terminals including signal terminals P11 and P12 that are signal input and output terminals of the amplifier circuit 311. The third component 32 includes a plurality of connection terminals including signal terminals P13 and P14 that are signal input and output terminals of the amplifier circuit 321.

Each of FIGS. 8A, 8B and 8C is a diagram illustrating an example of a structure of a coupler module 4. FIG. 8A is a plan view, FIG. 8B is a front view, and FIG. 8C is a side view.

As illustrated in FIGS. 8A, 8B and 8C, the module 4 is different from the module 2 illustrated in FIGS. 4A, 4B and 4C in that the second component 21 is replaced with the second component 31 and in that the third component 22 is replaced with the third component 32. The second component 31 and the third component 32 are arranged adjacent to each other so as to face the first component 14 when the module substrate 41 is viewed in plan view. Among the connection terminals of the second and third components 31 and 32, the terminals that are not the signal terminals P11 to P14 and whose terminal names are not illustrated are, for example, a ground terminal, a power supply terminal, a control terminal, and a heat dissipation terminal (the large terminal at the center).

Here, the signal terminals P11 and P12 of the second component 31 are each an example of the first signal terminal, the signal terminals P1 to P4 of the first component 12 are each an example of the second signal terminal, and the signal terminals P13 and P14 of the third component 32 are each an example of the third signal terminal.

According to the arrangements of the components and the connecting electrodes illustrated in FIGS. 8A, 8B and 8C, the following advantageous effects can be obtained in addition to the advantageous effects of the modules 1 and 2 described above.

When viewed in plan view, the third component 32 is divided into two portions A7 and A8 by an axis X5. The third portion A7 is closer to the second component 31, and the fourth portion A8 is farther from the second component 31.

In the case illustrated in FIGS. 8A, 8B and 8C, the shortest distance from the portion A7 to the second component 31 and the shortest distance from the portion A8 to the second component 31 are the shortest distance L7 and the shortest distance L8, respectively, and the shortest distance L8 is longer than the shortest distance L7. Thus, in the third component 32, the portion A8 is farther from the second component 31 than the portion A7 is.

When viewed in plan view, among the signal terminals P13 and P14 of the third component 32, the signal terminal P13 is disposed in one of two portions obtained by dividing the third portion A7 by an axis X6, the one portion being farther from the signal terminal P11 of the second component 31.

When viewed in plan view, among the signal terminals P13 and P14 of the third component 32, the signal terminal P14 is disposed in one of two portions obtained by dividing the fourth portion A8 by the axis X6, the one portion being closer to the signal terminal P11 of the second component 31.

As a result, the signal terminals P13 and P14 may easily be spaced apart from each other in a diagonal direction of the third component 32, and thus, the isolation between the signal terminals P13 and P14 can be improved.

Note that, when viewed in plan view, the signal terminal P14 may be disposed in one of the two portions obtained by dividing the fourth portion A8 by the axis X6, the one portion being farther from the signal terminal P11 of the second component 31.

FIG. 9 is a plan view illustrating an example of a structure of a coupler module 4*a*.

As illustrated in FIG. 9, the difference between the module 4*a* that is equipped with an external circuit and the module 4 illustrated in FIG. 8A is the position of the third signal terminal P14 in a third component 32*a*. In the module 4*a*, when viewed in plan view, the third signal terminal P14 is disposed in one of two portions of the fourth portion A8 of the third component 32*a* that are obtained by dividing the fourth portion A8 by the axis X6, the one portion being farther from the signal terminal P11 of the second component 31.

According to the arrangements of the components and the connecting electrodes illustrated in FIG. 9, the signal terminals P13 and P14 may easily be spaced apart from each other in the direction in which a side E3 of the third component 32*a* extends, and thus, the isolation between the signal terminals P13 and P14 can be improved. In the case where the third component 32*a* has a rectangular shape having long sides and short sides when viewed in plan view and where the side E3 is one of the long sides, the isolation between the signal terminals P13 and P14 can be further improved.

The module 4*a* makes it easier to suppress the occurrence of an unnecessary coupling between the signal terminals P12 and P14 through which a particularly large amount of power flows and the couplers 100.

More specifically, the module 4*a* makes it easier to suppress the direct coupling between the signal terminals P12 and P14 and the auxiliary lines of the couplers 100 without passing through the main lines, and thus, the directionality of each of the couplers 100 can be improved.

In addition, it becomes easier to suppress an unnecessary coupling between the signal terminal P11 and each of the signal terminals P1 to P4 connected to the main lines of the couplers 100, and thus, abnormal operations such as oscillation and parasitic vibration of the amplifier circuits 311 and 321 can be prevented.

Note that, in FIGS. 8A, 8B and 8C and FIG. 9, the axis X5, which divides the third component 32 into the two portions when viewed in plan view, and the axis X6, which divides the third component 33 into the two portions when viewed in plan view, are respectively an axis that divides the third component 32 into two portions having the same area when viewed in plan view and an axis that divides the third component 33 into two portions having the same area when viewed in plan view. However, the way in which the axes X5 and X6 respectively divide the third components 32 and 33 is not limited to this. For example, the third component 32 may be divided into two portions having different areas by the axis X5, and the third component 33 may be divided into two portions having different areas by the axis X6. Even in the case where each of the third components 32 and 33 and is unevenly divided as mentioned above, if the signal terminals P13 and P14 are located at positions such as those mentioned above, and the isolation between the signal terminals P13 and P14 can be improved.

SUMMARY

As described above, a coupler module according to an aspect of the present disclosure is a coupler module in which a first component and a second component are mounted on a substrate, and in the coupler module, the first component includes a directional coupler having a main line and an auxiliary line. The second component includes an external circuit for processing a signal that flows into the main line or the auxiliary line and a plurality of first signal terminals that are input and output terminals of the external circuit for the signal. When viewed in plan view, the plurality of first signal terminals are arranged in a first portion that is one of two portions obtained by dividing the second component and that is farther from the first component.

As a result, the input and output terminals of the external circuit are arranged in the first portion that is one of the two portions obtained by dividing the second component and that is farther from the coupler, so that these terminals may easily be spaced apart from the coupler. This makes it easier to suppress the occurrence of an unnecessary coupling between the coupler and the external circuit without increasing the size of the coupler module, and the directionality of the coupler can be improved.

The plurality of first signal terminals may be arranged along a side of the first portion of the second component.

As a result, the input and output terminals of the external circuit are arranged along one of the sides of the first portion of the second component, the one side being farthest from the first component, and thus, the occurrence of an unnecessary coupling between the coupler and the external circuit may be more effectively suppressed.

The second component may have a rectangular shape having a long side that belongs to the first portion, and at least two of the plurality of first signal terminals may be arranged at two end portions of the long side.

As a result, in the at least two first signal terminals arranged at the two end portions of the long side, the isolation between the input and output terminals of the external circuit can be improved.

When viewed in plan view, the second component may include a ground terminal that is disposed between at least one of the plurality of first signal terminals and the first component.

As a result, the coupling between the input and output terminals of the external circuit and the coupler can be suppressed by using the ground terminal.

In addition, a coupler module according to another aspect of the present disclosure is a coupler module in which a first component and a second component are mounted on a substrate, and in the coupler module, the first component includes a directional coupler having a main line and an auxiliary line and a plurality of second signal terminals each of which is connected to the main line or the auxiliary line. The second component includes an external circuit for processing a signal that flows into the main line or the auxiliary line. When viewed in plan view, the plurality of second signal terminals are arranged in a second portion that is one of two portions obtained by dividing the first component and that is farther from the second component.

As a result, input and output terminals for the main line or the auxiliary line of the coupler are arranged in the second portion of the first component that is farther from the external circuit, so that these terminals may easily be spaced apart from the external circuit. This makes it easier to suppress the occurrence of an unnecessary coupling between the coupler and the external circuit without increasing the size of the coupler module, and the directionality of the coupler can be improved.

When viewed in plan view, at least half of the plurality of second signal terminals may be arranged along a side of the second portion of the first component.

As a result, at least half of the input and output terminals for the main line or the auxiliary line are arranged along one of the sides of the second portion of the first component, the one side being farthest from the second component. As a result, the occurrence of an unnecessary coupling between the coupler and the external circuit may be more effectively suppressed compared with the case where at least half of the input and output terminals are not arranged along the side.

When viewed in plan view, the first component may have a rectangular shape having a long side that belongs to the second portion, and at least two of the plurality of second signal terminals may be arranged at two end portions of the long side.

As a result, in the at least two second signal terminals arranged at the two end portions of the long side, the isolation between the input and output terminals of the coupler can be improved.

When viewed in plan view, the first component may include a ground terminal that is disposed between at least one of the plurality of second signal terminals and the second component.

As a result, the coupling between the input and output terminals of the external circuit and the coupler can be suppressed by using the ground terminal.

The second component may further include a plurality of first signal terminals that are input and output terminals of the external circuit for the signal, and when viewed in plan view, the plurality of first signal terminals may be arranged in a first portion that is one of two portions obtained by dividing the second component and that is farther from the first component.

As a result, the input and output terminals of the external circuit are arranged in the first portion that is one of the two portions obtained by dividing the second component and that is farther from the coupler, so that these terminals may easily be spaced apart from the coupler. This makes it easier to suppress the occurrence of an unnecessary coupling between the coupler and the external circuit without increasing the size of the coupler module, and the directionality of the coupler can be improved.

The external circuit may be a filter circuit.

As a result, an unnecessary coupling between the coupler and the filter circuit is suppressed, and the likelihood of an unwanted signal leakage to an output end of the filter circuit from the coupler by an unnecessary coupling is reduced. This makes it easier to obtain favorable filter characteristics.

The external circuit is an amplifier circuit.

As a result, an unnecessary coupling between the coupler and the amplifier circuit is suppressed, and the likelihood of an unwanted signal leakage to the coupler from an output end of the amplifier circuit by an unnecessary coupling is reduced. As a result, abnormal operations such as oscillation and parasitic vibration are less likely to occur.

In addition, a third component may be mounted on the substrate. The third component may include an external circuit for processing a signal that flows into the main line or the auxiliary line, and a plurality of third signal terminals that are input and output terminals of the external circuit for the signal. The second component and the third component may be arranged adjacent to each other so as to face the first component when the substrate is viewed in plan view. When two portions obtained by dividing the third component are viewed in plan view, one of the two portions that is closer to the second component is a third portion, and another one of the two portions that is farther from the second component is a fourth portion. Some of the plurality of third signal terminals may be arranged in one of two portions obtained by dividing the third portion, the one portion being farther from one of the plurality of first signal terminals that is closest to the third portion, and some of the third signal terminals may be arranged in one of two portions obtained by dividing the fourth portion, the one portion being farther from the first component.

Accordingly, the input and output terminals of the external circuit of the third component may easily be spaced apart from the input and output terminals of the external circuit of the second component by being arranged in a portion of the third portion, which is closer to the second component than the fourth portion is, the portion being farther from the one first signal terminal of the second component closest to the third portion, and in the fourth portion that is farther from the second component than the third portion is. This makes it easier to suppress an unnecessary coupling between the input and output terminals of the external circuit of the second component and the input and output terminals of the external circuit of the third component without increasing the size of the coupler module, and the deterioration of the characteristics due to interference between the external circuits and signal leakage through both the external circuits can be suppressed.

In addition, a third component may be mounted on the substrate. The third component may include an external circuit for processing a signal that flows into the main line or the auxiliary line, and a plurality of third signal terminals that are input and output terminals of the external circuit for the signal. The second component and the third component may be arranged adjacent to each other so as to face the first component when the substrate is viewed in plan view. When two portions obtained by dividing the third component are viewed in plan view, one of the two portions that is closer to the second component is a third portion, and another one of the two portions that is farther from the second component is a fourth portion. Some of the plurality of third signal terminals may be arranged in one of two portions obtained by dividing the third portion, the one portion being farther from one of the plurality of first signal terminals that is closest to the third portion, and some of the third signal terminals are arranged in one of two portions obtained by dividing the fourth portion, the one portion being farther from the one first signal terminal closest to the third component.

Accordingly, the input and output terminals of the external circuit of the third component may easily be spaced apart from the input and output terminals of the external circuit of the second component by being arranged in a portion of the third portion, which is closer to the second component than the fourth portion is, the portion being farther from the one first signal terminal of the second component closest to the third portion, and in the fourth portion that is farther from the second component than the third portion is. This makes it easier to suppress an unnecessary coupling between the input and output terminals of the external circuit of the second component and the input and output terminals of the external circuit of the third component without increasing the size of the coupler module, and the deterioration of the characteristics due to interference between the external circuits and signal leakage through both the external circuits can be suppressed.

A ground terminal may be disposed between at least one of the plurality of third signal terminals of the third component and the first component.

As a result, the coupling between the input and output terminals of the external circuit of the third component and the coupler can be suppressed by using the ground terminal.

The external circuit formed in the second component and the external circuit formed in the third component may each be a filter circuit.

As a result, an unnecessary coupling between the filter circuit of the second component and the filter circuit of the third component is suppressed, and thus, for example, the deterioration of the filter characteristics that is caused by the interference between the filter circuits such as ripple in a pass band and spurious response in a stop band can be minimized.

The present disclosure can be widely used as a coupler module equipped with a signal-processing circuit that processes a high-frequency signal in various high-frequency devices such as a communication device.

1, 2, 3, 4, 4*a* coupler module (module)
11 to 14 first component
100 coupler
101 to 104 switch circuit
105 variable terminator
106 variable attenuator
107 control/power supply unit
21, 31 second component
22, 32 third component
211, 221 filter circuit
311, 321 amplifier circuit
41 module substrate
47 mounting terminal
48 conductive bonding material
49 sealing resin
A1 to A8 portion
P1 to P14 signal terminal
E1 to E3 side

The invention claimed is:

1. A coupler module having a first component and a second component mounted on a substrate, wherein the first component includes a directional coupler having a main line and an auxiliary line, wherein the second component includes an external circuit for processing a signal flowing into the main line or the auxiliary line, and a plurality of first signal terminals being input and output terminals of the external circuit for the signal, and wherein, when viewed in plan view, the plurality of first signal terminals are arranged in a first portion, the first portion being one of two divided portions of the second component and being farther from the first component, wherein the plurality of first signal terminals are connected to a top surface of the substrate, wherein, when viewed in plan view, the second component has a rectangular shape having a long side belonging to the first portion, and at least two of the plurality of first signal terminals are arranged at two end portions of the long side.

2. The coupler module according to claim 1, wherein, when viewed in plan view, the plurality of first signal terminals are arranged along a side of the first portion of the second component.

3. The coupler module according to claim 2, wherein, when viewed in plan view, the second component includes a ground terminal disposed between at least one of the plurality of first signal terminals and the first component.

4. The coupler module according to claim 1, wherein, when viewed in plan view, the second component includes a ground terminal disposed between at least one of the plurality of first signal terminals and the first component.

5. The coupler module according to claim 1, wherein the external circuit is a filter circuit.

6. The coupler module according to claim 1, wherein the external circuit is an amplifier circuit.

7. The coupler module according to claim 1, further comprising a third component mounted on the substrate, wherein the third component includes an external circuit for processing a signal flowing into the main line or the auxiliary line, and a plurality of third signal terminals being input and output terminals of the external circuit for the signal, wherein the second component and the third component are arranged adjacent to each other so as to face the first component when the substrate is viewed in plan view, wherein, when two divided portions of the third component are viewed in plan view, one of the two portions being closer to the second component is a third portion, and another one of the two portions being farther from the second component is a fourth portion, and wherein some of the plurality of third signal terminals are arranged in one of two divided portions of the third portion, the one portion of the third portion being farther from one of the plurality of first signal terminals being closest to the third portion, and some of the third signal terminals are arranged in one of two divided portions of the fourth portion, the one portion of the fourth portion being farther from the first component.

8. The coupler module according to claim 7, wherein a ground terminal is disposed between at least one of the plurality of third signal terminals of the third component and the first component.

9. The coupler module according to claim 7, wherein the external circuit provided on the second component and the external circuit provided on the third component are each a filter circuit.

10. The coupler module according to claim 1, further comprising a third component mounted on the substrate, wherein the third component includes an external circuit for processing a signal flowing into the main line or the auxiliary line, and a plurality of third signal terminals being input and output terminals of the external circuit for the signal, wherein the second component and the third component are arranged adjacent to each other so as to face the first component when the substrate is viewed in plan view, wherein, when two divided portions of the third component are viewed in plan view, one of the two portions being closer to the second component is a third portion, and another one of the two portions being farther from the second component is a fourth portion, and wherein some of the plurality of third signal terminals are arranged in one of two divided portions of the third portion, the one portion of the third portion being farther from one of the plurality of first signal terminals being closest to the third portion, and some of the third signal terminals are arranged in one of two divided portions of the fourth portion, the one portion of the fourth portion being farther from the one first signal terminal closest to the third component.

* * * * *